United States Patent
Boyer

[19]

[11] Patent Number: 5,923,132
[45] Date of Patent: Jul. 13, 1999

[54] METHOD AND APPARATUS FOR SYNCHRONONOUS MULTI-AXIS SERVO PATH PLANNING

[75] Inventor: Bradley R. Boyer, Clawson, Mich.

[73] Assignee: Allen-Bradley Company, LLC, Milwaukee, Wis.

[21] Appl. No.: 09/065,262

[22] Filed: Apr. 23, 1998

[51] Int. Cl.$^6$ ..................................................... H02P 1/54
[52] U.S. Cl. .......................... 318/34; 318/567; 318/569; 364/474.3
[58] Field of Search ............................. 318/34, 567, 569; 364/474.3, 513

[56] References Cited

U.S. PATENT DOCUMENTS

| | | | |
|---|---|---|---|
| 3,572,925 | 3/1971 | Ables et al. | 355/46 |
| 4,595,989 | 6/1986 | Yasukawa et al. | 364/513 |
| 4,998,132 | 3/1991 | Kurogane et al. | 364/513 X |
| 5,406,494 | 4/1995 | Schuett | 364/474.3 |

*Primary Examiner*—Karen Masih
*Attorney, Agent, or Firm*—William R. Walbrun; John M. Miller; John J. Horn

[57] ABSTRACT

A motion controller generates commands to control electric motors of a multi-axis industrial machine in accordance with calculated positions set forth in a path planning table. In a method of generating the path planning table, a series of coordinates are entered into a system that correspond to positions of the machine along a complete cycle of a desired path. The coordinates are proportionally spaced based on distance, maximum speed and maximum acceleration factors. A path planning table is generated by determining the calculated positions based on a predetermined resolution using an S-curve mathematical equation that includes an alpha variable corresponding to an acceleration to jerk ratio. The value of the alpha variable is adjustable by the user during a testing procedure to allow for an optimal setting thereof.

17 Claims, 12 Drawing Sheets

METHOD AND APPARATUS FOR SYNCHRONONOUS MULTI-AXIS SERVO PATH PLANNING

BACKGROUND OF THE INVENTION

1. Field of the Invention

The present invention relates generally to motion control systems providing real-time control of industrial servo motors. More particularly, the invention pertains to a motion control system and method for providing improved control and performance in a multi-axis servo motor system.

2. Description of the Prior Art

In industrial automation applications, motion control systems are often used to control servo motors of an industrial machine to provide for accurate and repeatable positioning of moving machine parts and workpieces.

Multi-axis motion occurs when two or more axes of motion are involved in a single machine. The need for multi-axis synchronization arises when the axes must move together and the relationship between their respective motion is important. The position and velocity relationship between the axes will often be significant to the proper operation of the machine. Position coordination during motion may be required, for example, to avoid a collision between a moving machine part and another object. Accordingly, where multiple axes control the orientation of a moving part, the position and velocity synchronization of the axes will determine how accurately the part is oriented as it moves.

A typical motion control system consists of a motor, motor drive, and a motion controller. The controller accepts motion commands from a host computer or an internally stored program. These commands are interpreted by the controller to generate continuously updated position commands to the drive. The motor drive controls the current and frequency to the motor, which will result in the commanded position. In a multi-axis system, one controller can control several motors and drive combinations, or alternatively separate controllers can be operated under the control of a central control system.

Electronic feedback systems are employed by the controller, either from an incremental encoder or from a resolver. The actual position and velocity of the motor derived from the feedback is compared with that commanded in the motion profile during the controlled operation.

In a multi-axis control system which moves a machine part along a curved path, numerous points are predefined along the path. To provide a smooth transition between path segments, various known techniques are employed which utilize geometrical equations, such a circular arc and spline equations to produce a smoothing of the path to be followed. While such techniques typically produce satisfactory results, it has also been found that the use of such spline and arc equations can often produce undesirable acceleration and deceleration motor curves which reduce the motor performance. Further, such techniques can lead to motor problems including overheating and motor control problems including oscillation caused by high speed error correction during operation.

As will be described in greater detail hereinafter, the method and apparatus of the present invention solves the aforementioned problems and employs a number of novel features that render it highly advantageous over the prior art.

SUMMARY OF THE INVENTION

Accordingly, it is an object of this invention to provide a motion control system and method for synchronous multi-axis servo path planning.

Another object of this invention is to provide a motion control system which increases motor efficiency and reduces mechanical wear.

Still another object of this invention is to provide path planning that eliminates the utilization of geometrical path smoothing techniques.

Yet another object of this invention is to provide a system and method of motion control that reduces jerk movements, increases system speed, and allows for adjustment of the acceleration to jerk ratio.

To achieve the foregoing and other objectives, and in accordance with the purposes of the present invention a motion controller and method are provided for multi-axis control of electric motors of a multi-axis machine. The controller generates commands to control the motors of the machine in accordance with calculated positions set forth in a path planning table. To generate a path planning table, a series of coordinates are entered in the controller that correspond to positions of the machine along a complete cycle of a desired path. The coordinates are proportionally spaced based on distance, time, and speed factors. Calculation means are provided to generate the path planning table by determining the calculated positions based on a predetermined resolution using an S-curve mathematical equation that includes an alpha variable corresponding to an acceleration to jerk ratio. The value of the alpha variable is adjustable by the user during a testing procedure to allow for an optimal setting thereof.

Other objects, features and advantages of the invention will become more readily apparent upon reference to the following description when taken in conjunction with the accompanying drawings, which illustrate several embodiments of the invention.

DETAILED DESCRIPTION OF THE PREFERRED EMBODIMENTS

Figure 1:
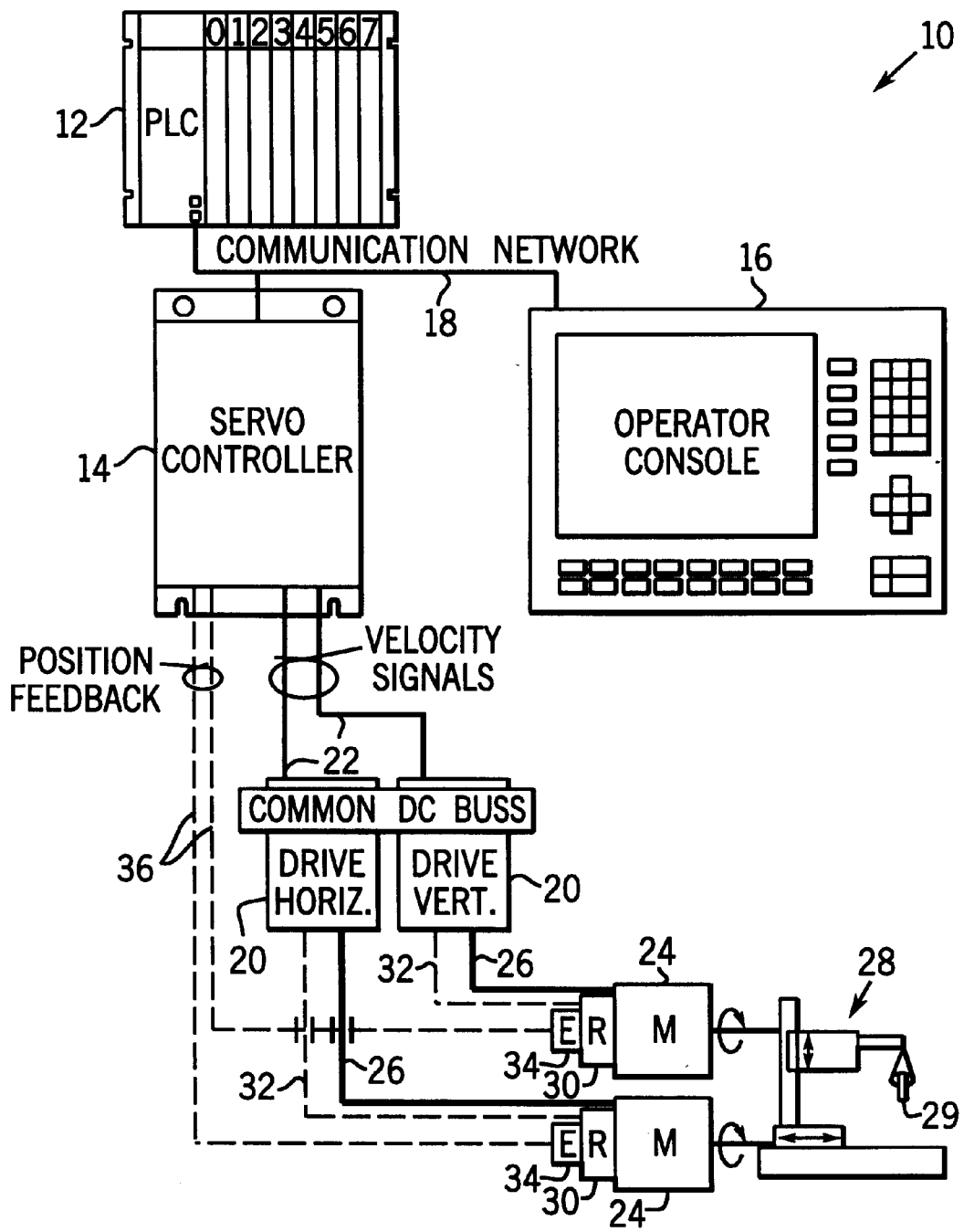
FIG. 1 is a block diagram of an exemplary motion control system in which path planning in accordance with the present invention may be implemented.

Referring now to the drawings, an exemplary motion control system 10 is illustrated in FIG. 1 in which path planning in accordance with the present invention may be implemented. The system 10 includes a central controller 12, such as a personal computer or PLC, a servo controller 14, and an operator console 16 for interfacing with the controllers 12,14. The controllers 12,14 and operator console 16 are interconnected through a conventional communication network 18.

The servo controller 14, which will be described in greater detail below, is connected to motor drivers 20 across ±10VDC lines 22 to pass velocity signals or commands generated by the controller 14 corresponding to position values read by the controller from a path planning table. A common DC Buss connects the drivers 20 together and is able to take advantage of a cancellation effect of acceleration and deceleration in the present invention as later described. Each motor driver 20 is connected to a motor 24, such as a servo motor, through lines 26 to allow the driver to control the current and frequency of the motor 24 based on the commands received from the controller 14. A separate motor 24 and driver 20 is needed for movement of each axis of a multi-axis machine 28. While the embodiment of FIG. 1 illustrates the use multi-axis movement in two axes, it should be understood that additional motors and drivers could be employed in accordance with the teachings of the present invention to provide a system having motion control in any number of desired axes.

Each motor 24 includes a resolver 30 of conventional type connected to a corresponding motor driver 20 across lines 32 and a feedback device 34, such as a conventional encoder, which is connected to the servo controller 14 across feedback signal lines 36 to provide feedback signals representative of the position of the motor 10 and the axis of machine 28 being moved.

In one preferred embodiment, the central controller 12 is of the type commercially available under the designation "PLC 5/40," the operator console is of the type commercially available under the designation "PanelView 1400e," the servo controller 14 is of the type commercially available under the designation "1394 Multi-Axis Motion Control System," which includes the controller 14 and drivers 20, and the motors 24 are of the type commercially available under the designation "1326AB," all of which are sold by the Allen-Bradley Company, Inc. of Milwaukee, Wis., an assignee of the present application.

Figure 2:
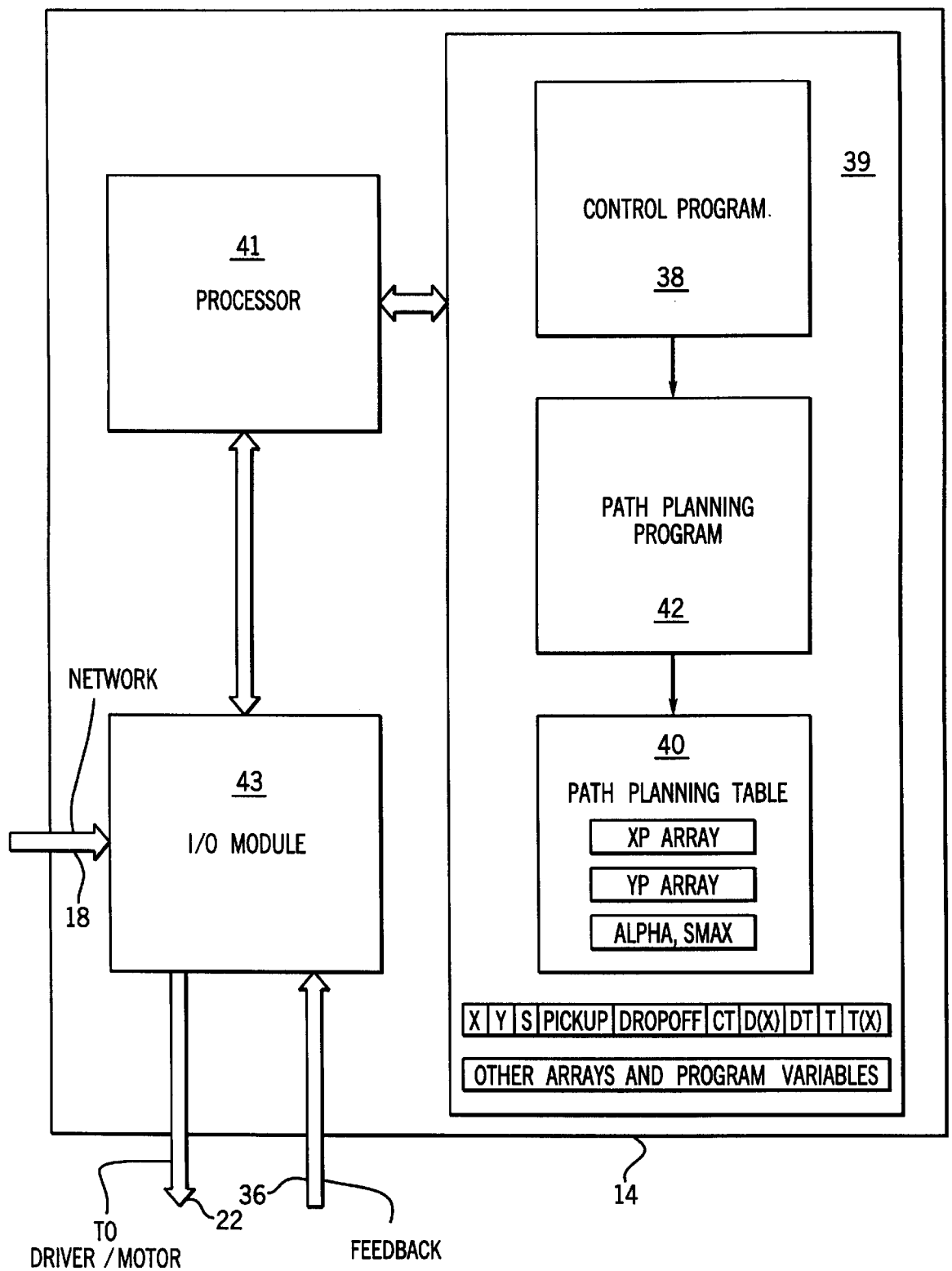
FIG. 2 is a block diagram of control programs residing in the servo controller of the present invention.

Referring to FIG. 2, the servo controller 14 includes a control program 38 residing within memory 39, such as RAM or ROM, which executes the positions contained in a path planning table 40 which also resides within memory 39 of the controller 14. The path planning method and resulting system of the present invention may be implemented by first downloading a path planning program 42 into the memory 39 of the controller 14 through the I/O module 43 of the controller 14. The path planning program 42 allows for creation of the path planning table 40 which is executed by the processor 41 of controller 14 during machine 28 operation. It should be noted that while a conventional servo controller 14 (FIG. 1) is being utilized, the path planning program 42 of the present invention stored within the controller 14, as well as the steps illustrated later in FIGS. 3–9 are not part of the conventional controller.

In the following description and within the program 42 flowcharts, numerous specific details are set forth in order to provide a thorough understanding of the present invention, as well as setting forth an example implementation. It will be obvious, however, to one skilled in the art that the present invention may be practiced without some of these specific details and could be used for any desired motion control application. In other instances, well-known circuits, structure and techniques have not been shown in detail, in order not to unnecessarily obscure the present invention.

Figure 3:
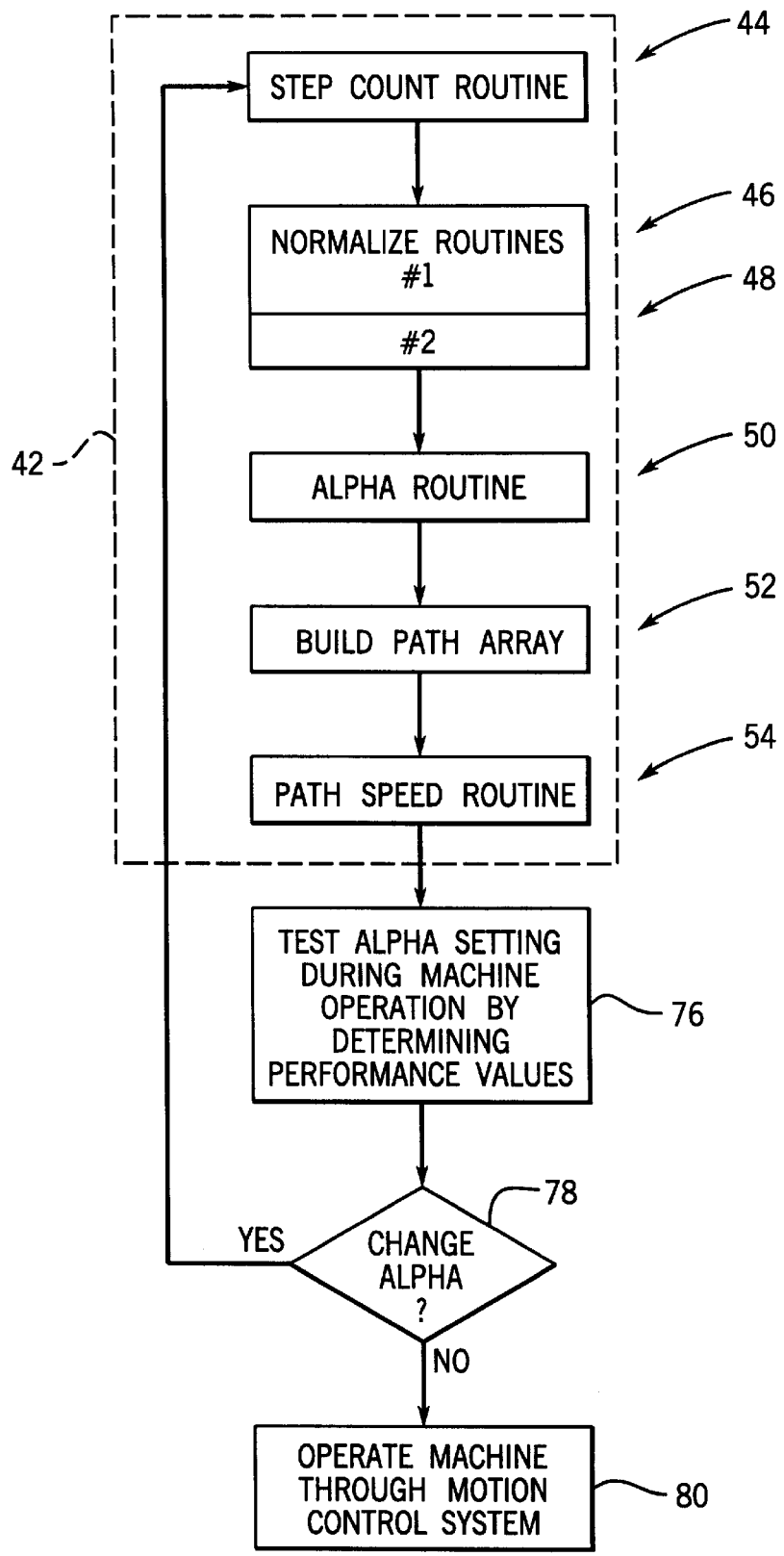
FIG. 3 is a flowchart illustrating steps carried out by the path planning program.
Figure 4:
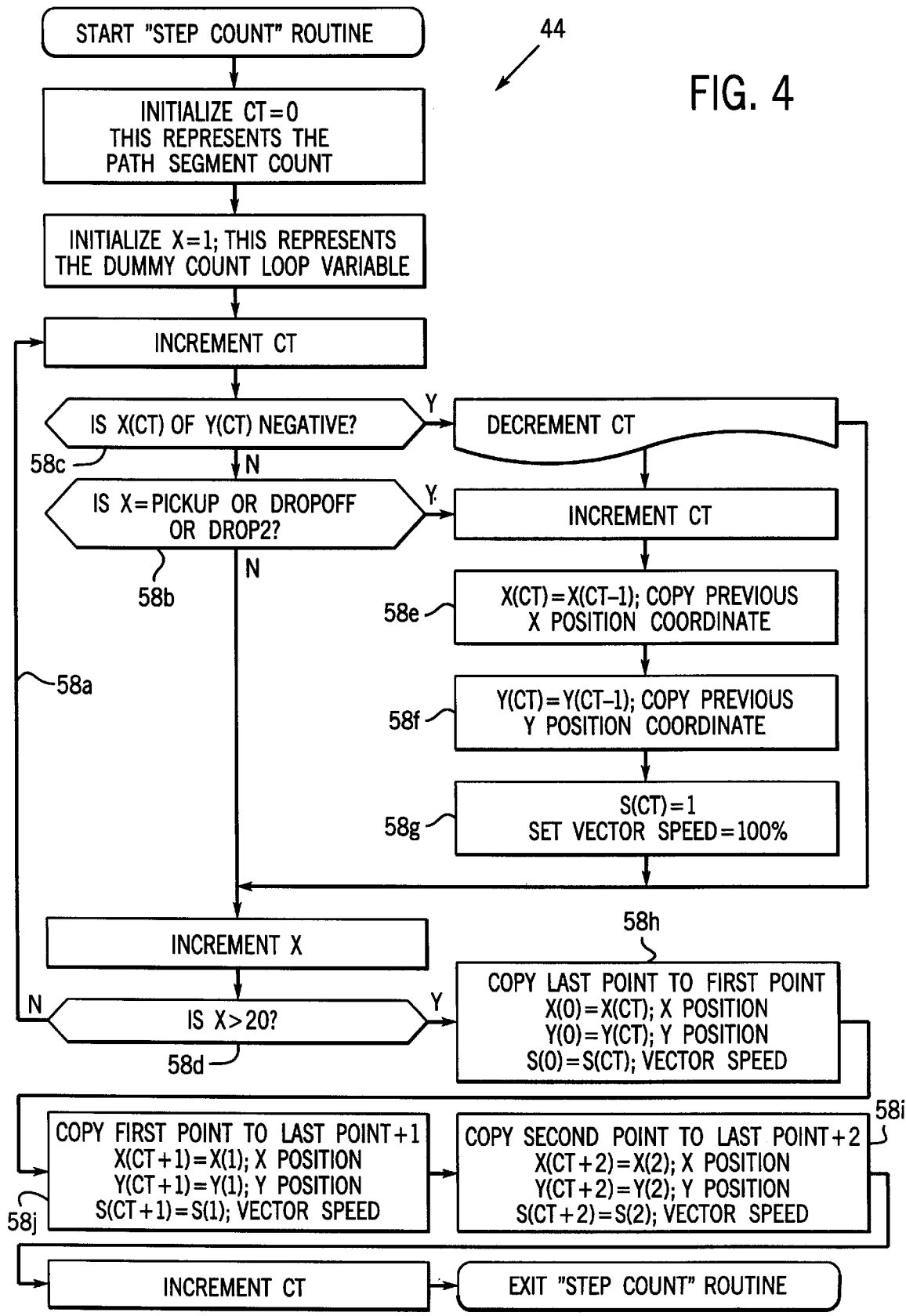
FIG. 4 is a flowchart illustrating steps carried out by the step count routine of FIG. 3.

Referring now to FIG. 3, the routines of the path planning program 42 are illustrated. These routines include a step count routine 44, normalize routines 46,48, alpha routine 50, build array routine 52, and path speed routine 54. The routines of the path planning program 42 are described below in more detail. FIGS. 4–9, which illustrate flowcharts of the routines in a preferred embodiment, also provide additional programming details to assist in a further understanding of the implementation. However, it should be appreciated that a detailed discussion of certain details outlined in the flowcharts of FIGS. 4–9 have been omitted where it is believed that one skilled in the art of computer programming and motion controllers would find such details self-explanatory.

In the set-up of a motion profile, a user will input data on the operator console 16 which can be stored in the memory 39 (FIG. 2) the controller 14. The data includes a user-entered series of coordinates representing positions of the machine 28 along a complete cycle of the general desired path to be repeatably followed during machine operation. The data will also preferably include information corresponding to pickup or drop-off points where the machine 28 will pickup or drop a workpiece 29 (FIG. 1) or other member along this path. The following Table A illustrates sample data for an example motion profile to be calculated.

TABLE A

Sample Data:

| | | |
|---|---|---|
| Pickup Point: | 1 | |
| 1st Drop Point: | 0 | (1st drop point not used in this model) |
| Drop Point: | 4 | |
| X1, Y1, S1: | 100,12,100 | (path "pick up" point) |
| X2, Y2, S2: | 100,0,100 | |
| X3, Y3, S3: | 0,0,100 | |
| X4, Y4, S4: | 0,12,100 | (path "drop-off" point) |
| X5, Y5, S5: | 0,0,100 | |
| X6, Y6, S6: | 100,0,100 | |
| X7, Y7, S7: | −1,−1,−1 | (a series of −1s is used as a data terminator) |
| X8, Y8, S8: | −1,−1,−1 | |
| X9, Y9, S9: | −1,−1,−1 | |
| X10, Y10, S10: | −1,−1,−1 | |
| X11, Y11, S11: | −1,−1,−1 | |
| X12, Y12, S12: | −1,−1,−1 | |
| X13, Y13, S13: | −1,−1,−1 | |
| X14, Y14, S14: | −1,−1,−1 | |
| X15, Y15, S15: | −1,−1,−1 | |
| X16, Y16, S16: | −1,−1,−1 | |
| X17, Y17, S17: | −1,−1,−1 | |

In the foregoing sample data, six points of movement have been determined by the user. The X variable indicates a value of movement of inches in an X-axis, the Y value indicates movement of inches in an Y-axis, and the S variable indicates a speed percent of operation of the motor. Where the memory array within memory 39 holding the data points is configured to hold data points entries greater than that needed by the user for the particular desired motion application being set, data terminators may be set. In the above sample data, for example, positions 7–17 have received values of negative one as a data terminator. Further, positions one and four have been set by the user to indicate the respective pickup and drop-off points of the workpiece 29 (FIG. 1) by machine 28.

The following Table B defines variables referenced in FIGS. 4–9 that relate to known values that are entered by the user prior to generating a path planning table. The initial value of the alpha variable is described in more detail later.

TABLE B

| | |
|---|---|
| XS: | The Maximum Speed of the Horizontal Servo Motor in (in/s). |
| YS: | The Maximum Speed of the Vertical Servo Motor in (in/s). |
| XT: | The Maximum Acceleration of the Horizontal Servo Motor in (in/s/s). |
| YT: | The Maximum Acceleration of the Vertical Servo Motor in (in/s/s). |
| XM: | The Maximum "Mechanical" Acceleration of the Horizontal Axis in (in/s/s). |
| YM: | The Maximum "Mechanical" Acceleration of the Vertical Axis in (in/s/s). |
| alpha: | Acceleration to jerk Ratio adjustable for specific machinery. |

After the user enters the initial data, the path planning program 42 is executed. The first process of program 42 includes a step count routine 44 illustrated in FIG. 4 which allows the processor to parse through the data of the X and Y arrays in a loop 58a using loop variable CT looking for pickup or drop-off points, indicated at step 58b, until a data terminator is received at step 58c or until the end of a predetermined array size is exceeded at step 58d. In the preferred embodiment illustrated, a pickup or drop-off point in the array of data is then doubled at step 58e or 58f to properly adjust the array length to accommodate this occurrence for purposes of calculating proper acceleration and deceleration to and from the respective pair of points. The speed for the newly added position is set at 58g. In the preferred embodiment, the speed shown at step 58g. is set to a value of 1.0 to represent in the calculated mathematics that 100% maximum motor speed is desired. In the present sample data illustrated above, the six points of movement would be translated into eight points as a result of the step count routine 42 due to the additional two points corresponding the pickup and drop-off points at points one and four respectively. Before the routine 42 is completed, the X and Y arrays have additional points added at steps 58h,58i, and 58j to allow for the cyclical design in rotary applications.

Figure 5A:
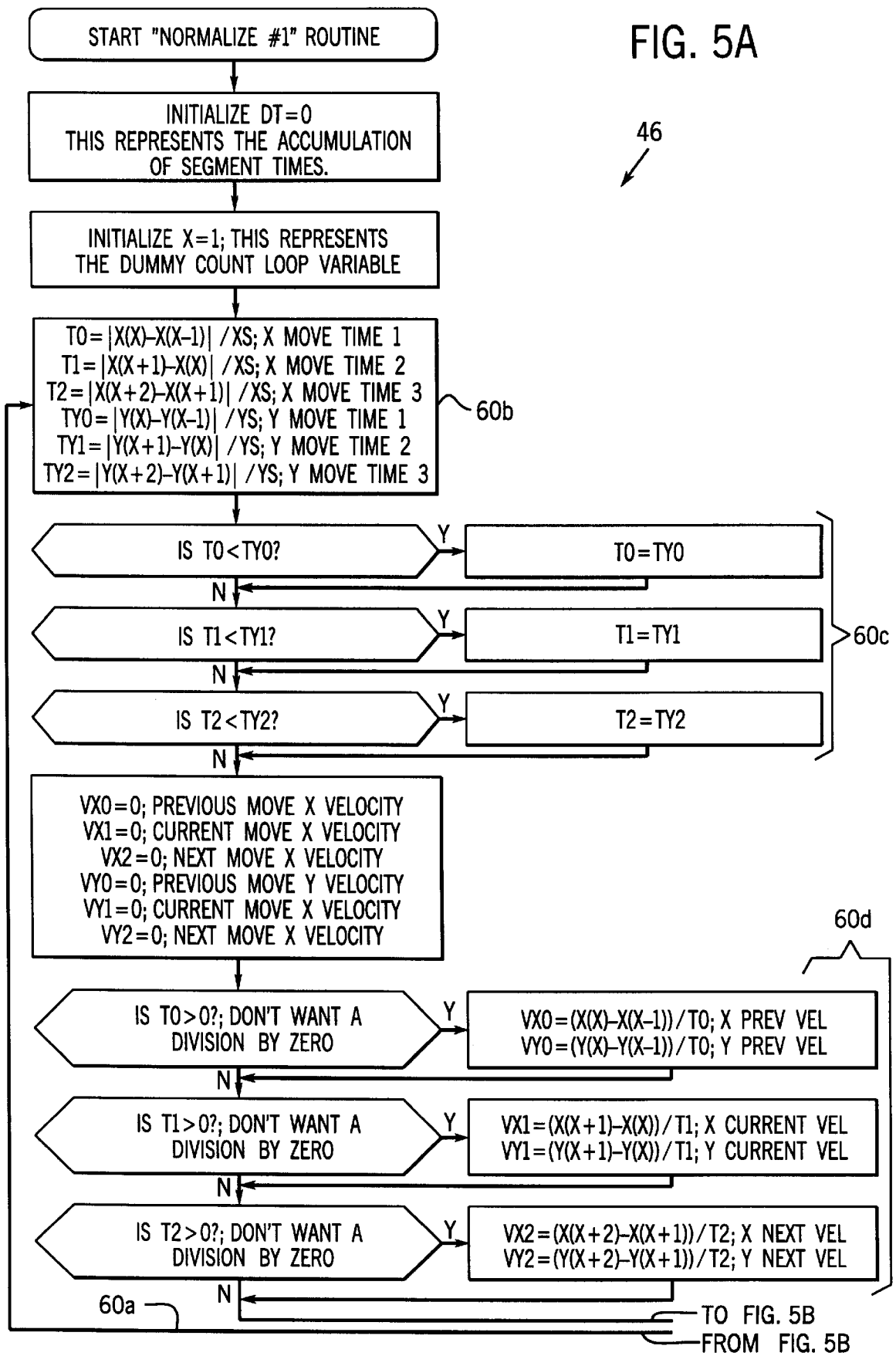
FIG. 5 is a flowchart illustrating steps carried out by the first normalize routine of FIG. 3.
Figure 5B:
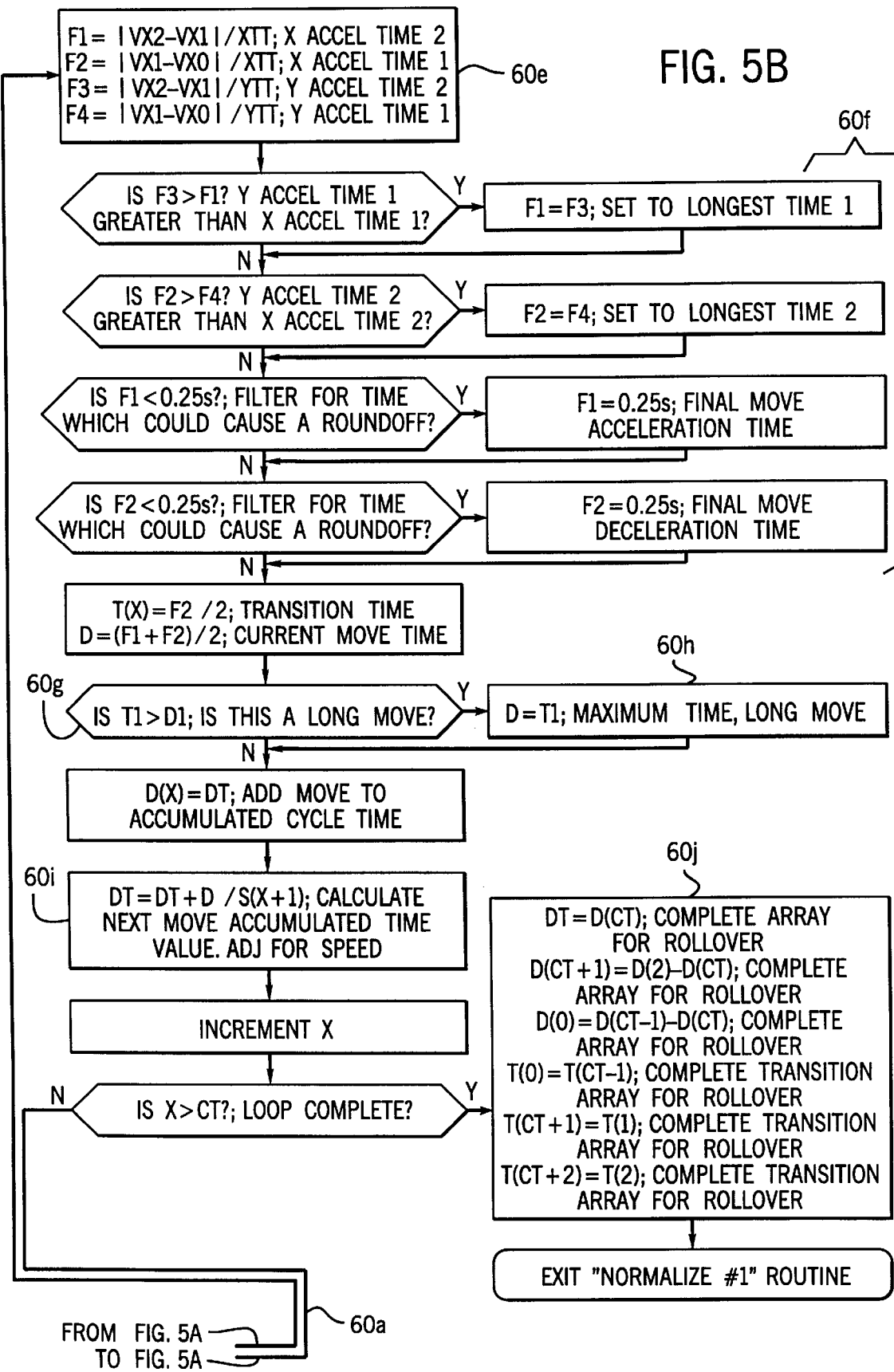

Referring to FIG. 5, the first normalize routine 46 is executed as outlined in this flowchart. The normalize routine 46 parses through the data in loop 60a and proportionally spaces the individual moves across an entire 360° path based on distance, maximum speed and maximum acceleration factors, and thereby creates internal arrays as illustrated to contain this information. Further, the normalize routine 46 calculates the accumulated time DT, and the transition time T(X), which corresponds to the transition time from one velocity to the next velocity.

In particular, at step 60b the move times are calculated for each axis, which includes the previous move, present move, and next move. In the present embodiment, this relates to axes X and Y as illustrated. A maximum value is set at T0, T1, and T2 at steps 60c. Previous, present or current, and next velocities are determined at steps 60d. Acceleration transition times for X and Y are determined by functions F1, F2, F3, and F4 at step 60e. The worst case transition times are calculated at steps 60f using maximum acceleration data for both axes. If acceleration times are less than 0.25s, such resolution would be lost when this data is normalized to 360° in the following routine, so a value of 0.25s is entered to preserve some resolution in this preferred embodiment. At steps 60g and 60h, it is determined if there is a long move or short move. A short move is one with only acceleration and deceleration. A long move also includes a steady-state velocity. If a long move is present, time D is set to the maximum determined at steps 60c. At step 60i, adjustment for speed is made where the speed variable S may have been varied in its value entered by the user. At step 60j, the arrays are completed to compensate for rotary rollover.

Figure 6:
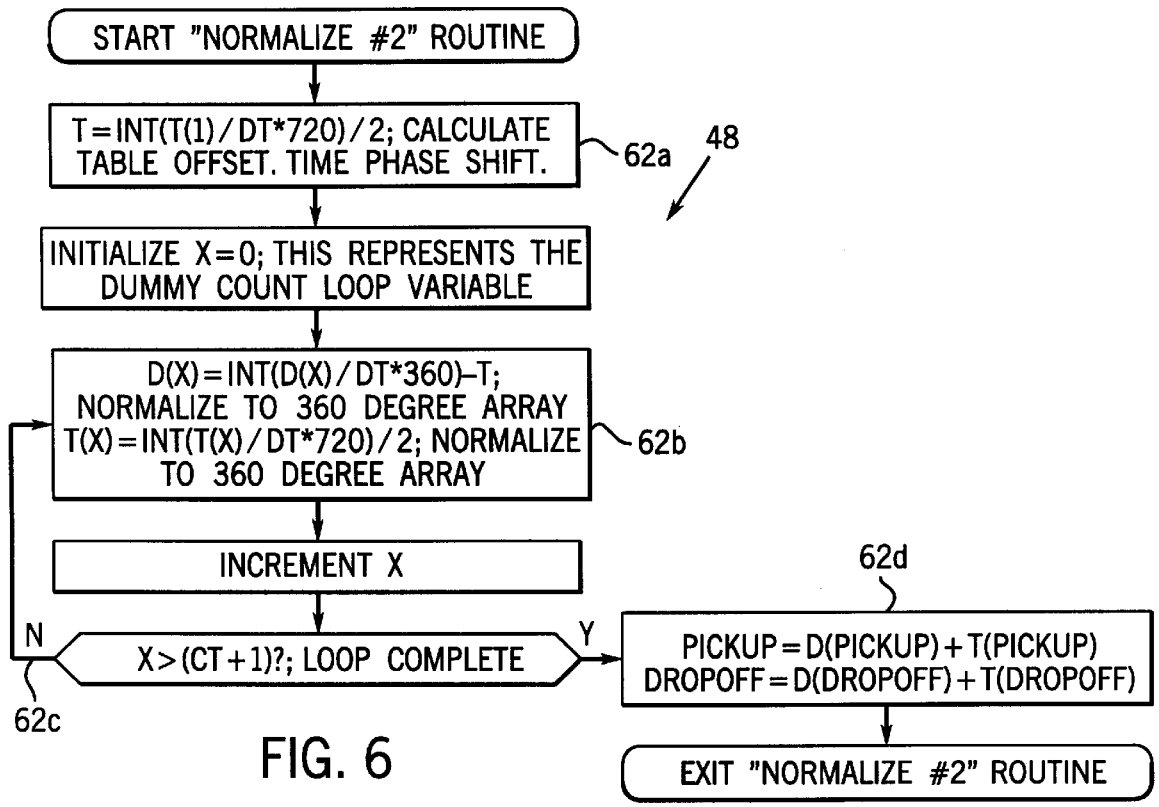
FIG. 6 is a flowchart illustrating steps carried out by the second normalize routine of FIG. 3.

Referring to FIG. 6, the second normalize routine 48 is executed which utilizes the D(X), DT, and T(X) variables calculated in the first normalize routine 46 to convert seconds of movement into 360° degrees. At step 62a, T is calculated at the first pickup point so that the entire array can be shifted to start with the first pickup point. The predetermined resolution for the preferred embodiment shown is entered at 720 as shown in the calculation at step 62a. Step 62b converts the time arrays to degree array through loop 62c. PICKUP and DROPOFF, as variables, are defined at step 62d.

Figure 7:
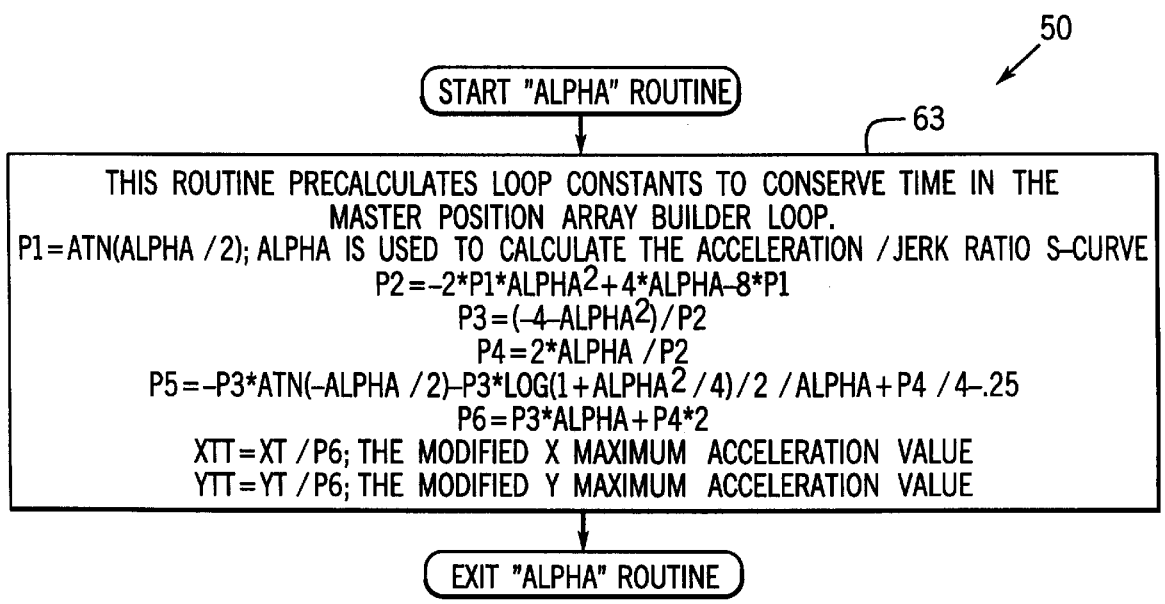
FIG. 7 is a flowchart illustrating steps carried out by the alpha routine of FIG. 3.

Referring to FIG. 7, a set of constants P1–P6 relating to the alpha variable are precalculated at step 63 to conserve execution time in the build array routine 52. It should be understood, however, that the constants could be implemented within the build array routine 52. The alpha variable is an adjustable variable corresponding to the peak acceleration ($2^{nd}$ derivative of position) to peak jerk ratio ($3^{rd}$ derivative of position), and is described in more detail below. The constants P1–P6 are as follows:

P1=ATN(alpha/2);

P2=2*P1*alpha$^2$+4*alpha-8*P1

P3=(-4-alpha$^2$)/P2

P4=2*alpha/P2

P5=-P3*ATN(-alpha/2)-P3* LOG (1+alpha$^2$/4)/2/alpha+P4/4-.25

P6=P3*alpha+P4*2

Figure 8A:
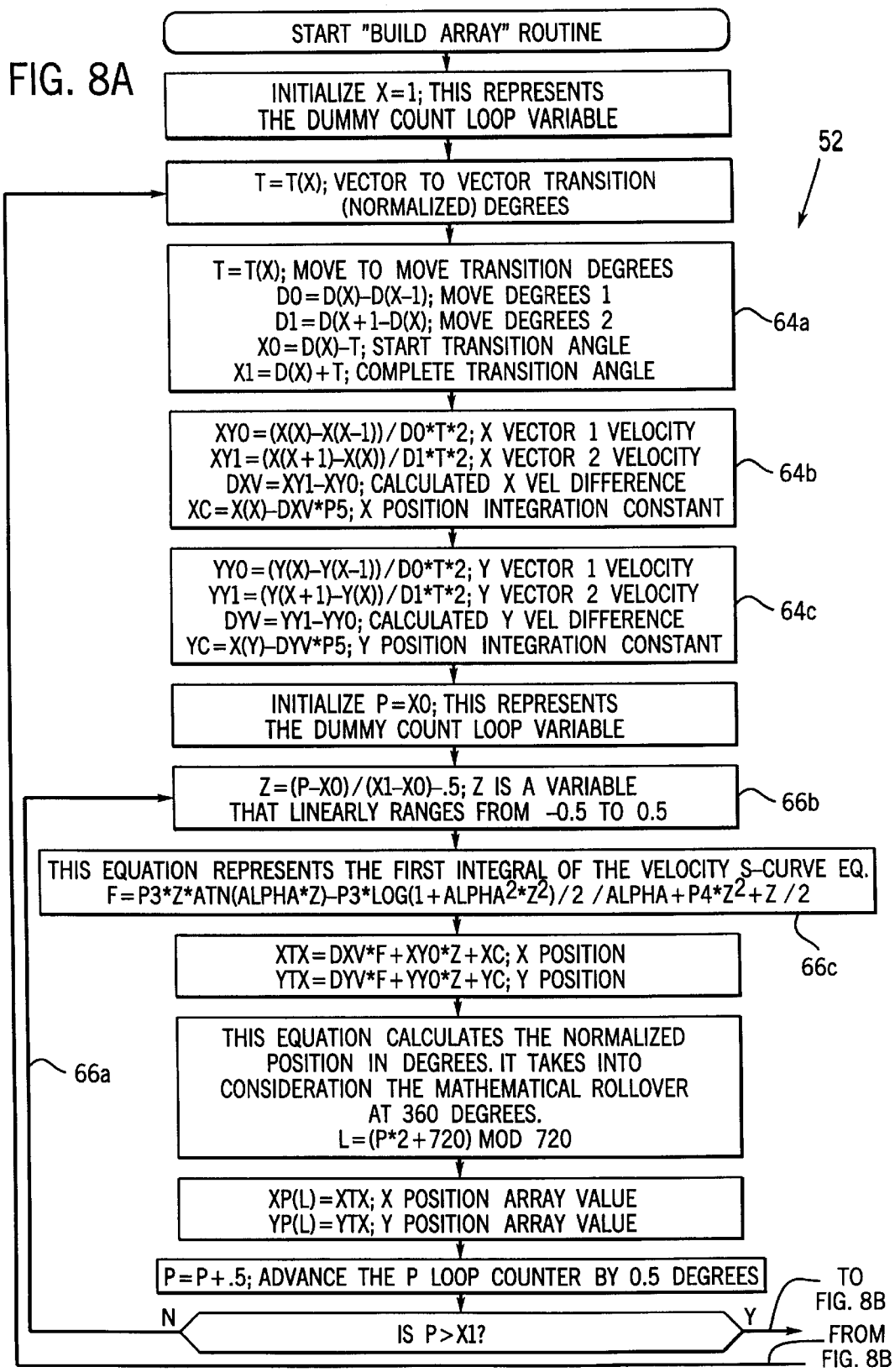
FIG. 8 is a flowchart illustrating steps carried out by the build path array routine of FIG. 3.
Figure 8B:
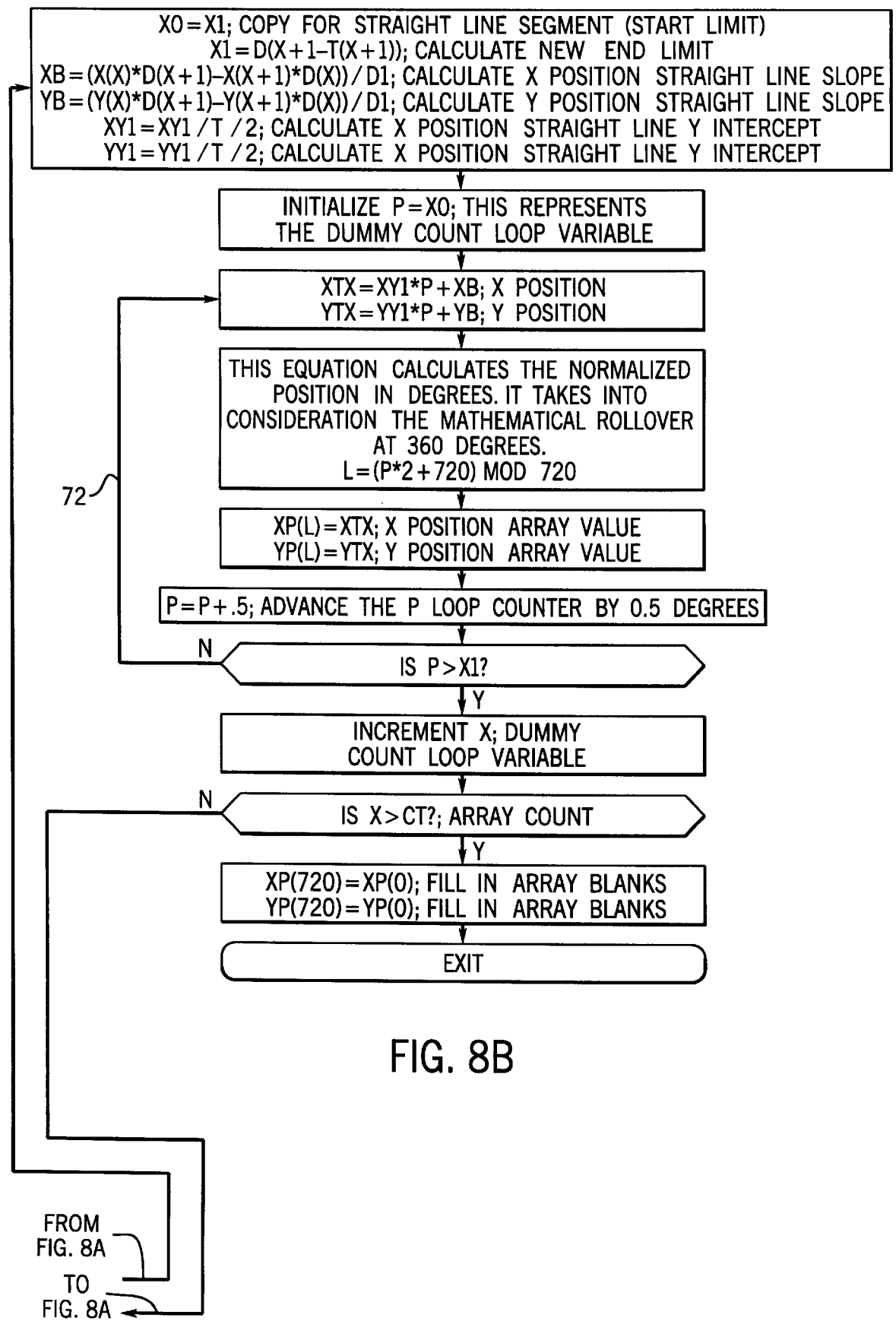

Referring now to FIG. 8, the build array routine 52 is executed by the path planning program 52 to generate the path planning table 40 having arrays of positions for each axis which will be sequentially executed by the control program 38 during machine operation. Each position will be executed at a timed interval 360/SMAX, which is determined in the path speed routine 54 and is later described in more detail.

With respect to build array routine 52, it should be noted in FIG. 8 that a resolution of 720 points per complete 360° cycle had been preselected in FIG. 8 for the preferred embodiment illustrated herein. However, it should be understood that the desired resolution can be selected by the user depending on the desired application and machinery requirements. It has been found that most industrial automation applications require a resolution of at least 720 points, however the amounts of resolution could be as much as ten thousand or more. Referring to steps 64a,64b, and 64 c, the initial velocity ending velocity, velocity difference therebetween, and integration constant are precalculated. Loop 66a builds the velocity S-curve and uses a Z variable at step 66b, which is a normalized velocity S-curve transition variable. In particular, the equation at step 66c for calculating the velocity S-curve acceleration profile utilizing the alpha variable, which changes the peak acceleration to jerk ratio, is as follows:

$$F=P3Z*ATN(alpha*Z)-P3*LOG(1+alpha^2*Z^2)/2/alpha+P4*Z^2+Z/2$$

When completed, arrays XP and YP will each contain an array of positions from 0–719 which together form the path planning table. The last portion of the build array routine 52 includes loop 72 that calculates steady-state velocity between transitions. In other words, the steps of loop 72 fill in the positions of the arrays XP and YP that do not have changes in velocity. After completion of the build array routine, the path planning table 40 has been completed and the program 42 executes the path speed routine 54, illustrated in FIG. 9.

Figure 9:
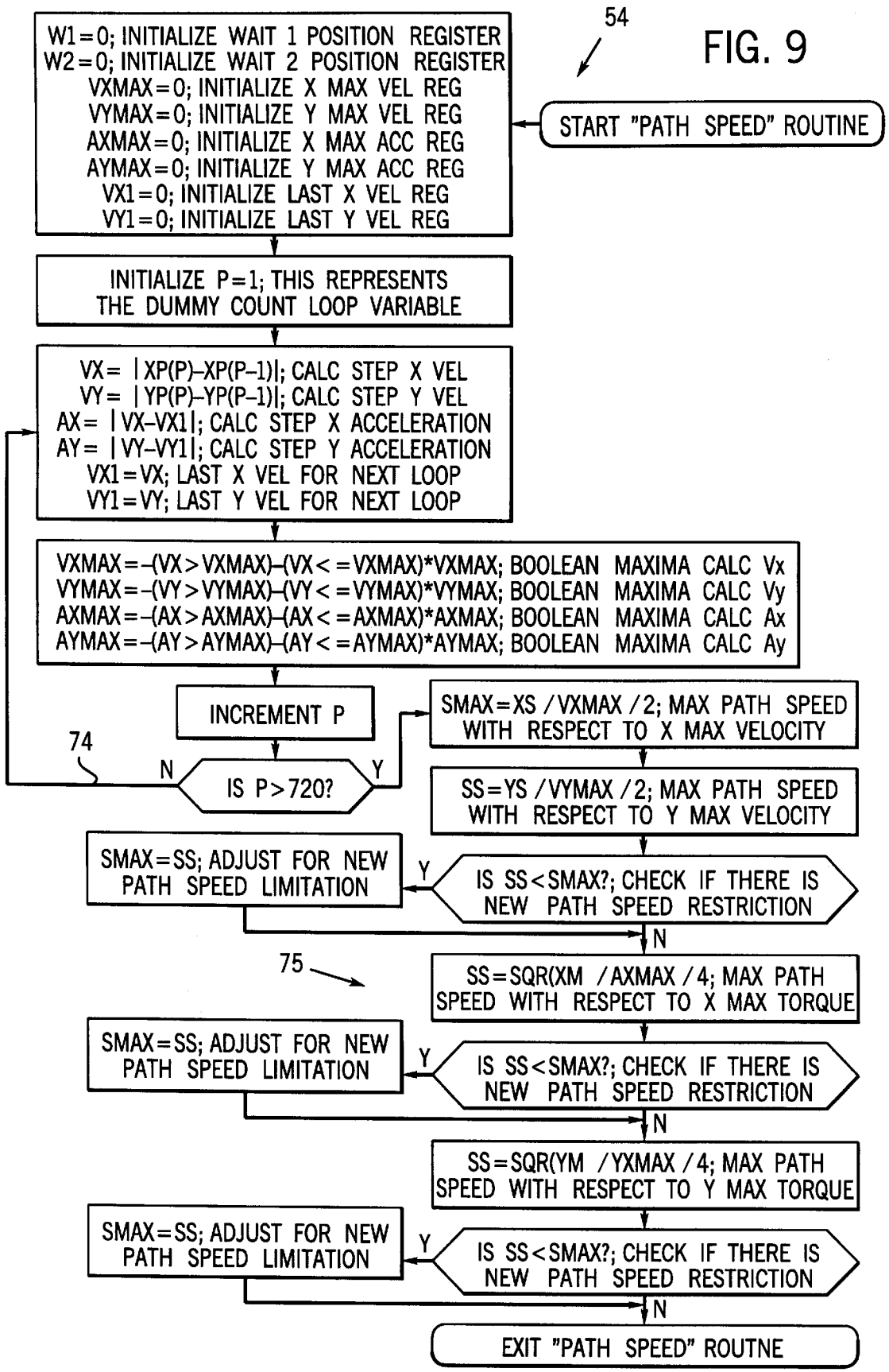
FIG. 9 is a flowchart illustrating steps carried out by the path speed routine of FIG. 3.

Referring to FIG. 9, the path speed routine 54 parses through the table of points in arrays XP and YP created for the X and Y axes to determine the distance between points and to determine the peak acceleration and peak velocity. To make these calculations, loop 74 calculates the maximum values using first and second derivatives of the points, as illustrated in FIG. 9, to determine the maximum acceleration and velocity for each axis X and Y. This determination allows a user to confirm that the maximum acceleration and velocity calculated does not exceed the capacity of the motors 24. Further, the variable SMAX is determined at steps 75 to contain a value that will correspond to the rate of speed that the points or positions of the table 40 will be executed by the controller 14 during machine operation. In the calculations, it should be noted that the constants of Table B are utilized in steps 75 such that the SMAX possible value range will be less than or equal to the slowest motor's maximum speed or acceleration.

After execution of the path planning program 42, the optimal setting of the alpha variable is determined, as illustrated in FIG. 2. During the initial preparation of the plan planning table 40, the value of alpha was set to a predetermined value, such as 1.0. Preferably, the value of alpha is set low or very high (FIG. 10) so that as adjusted, the value can be repeatably increased or decreased to an optimal setting which will fall somewhere therebetween.

Figure 10:
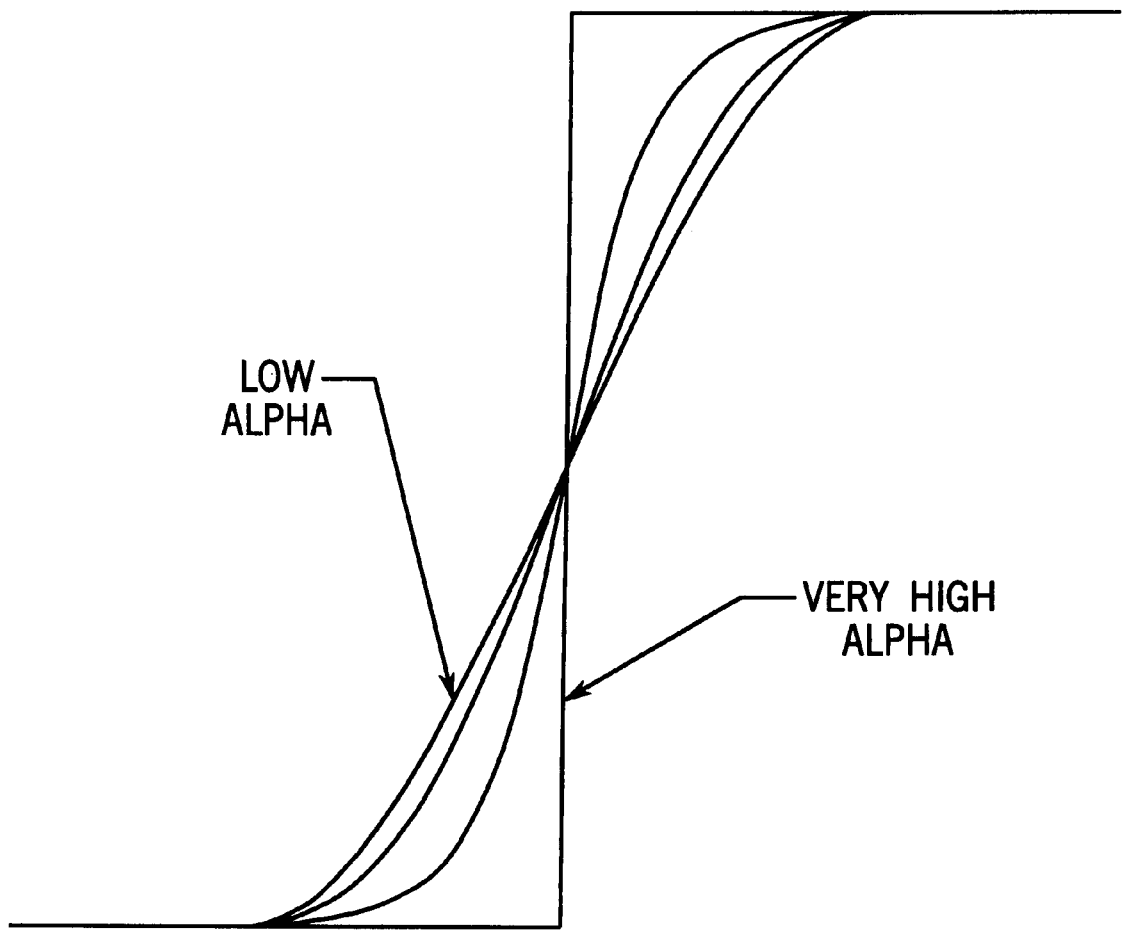
FIG. 10 is a graphical representation of velocity curves created when the alpha variable has been adjustably modified in accordance with the alpha control techniques of the present invention to set alpha at an optimal value.

During step 76, the machine is operated through a complete path with chart recorders of conventional design connected to each of the motors 24 to monitor the characteristics of each of the motor's performance and to determine motor performance values including peak velocity, acceleration and torque. The value of alpha can be adjustably modified by the user at step 78 by entering a new value to find an optimal setting corresponding to the best performance values determined during testing. FIG. 10 illustrates a graphical representation of velocity curves created when the alpha variable has been adjustably modified to set alpha at an optimal value somewhere between its low and high setting range. It should be understood that the optimal value for alpha will accordingly differ for each system application. The path planning program 42 is then re-executed to generate a new path planning table 40 corresponding to the new alpha value that has been entered. The process of testing the motor performance and modifying the value of alpha is repeated to increase throughput and to achieve peak velocity and peak torque performance of the motors 24. Once an optimal value of alpha is determined, the machine 28 is ready for normal operation at step 80, as previously described.

Figure 11:
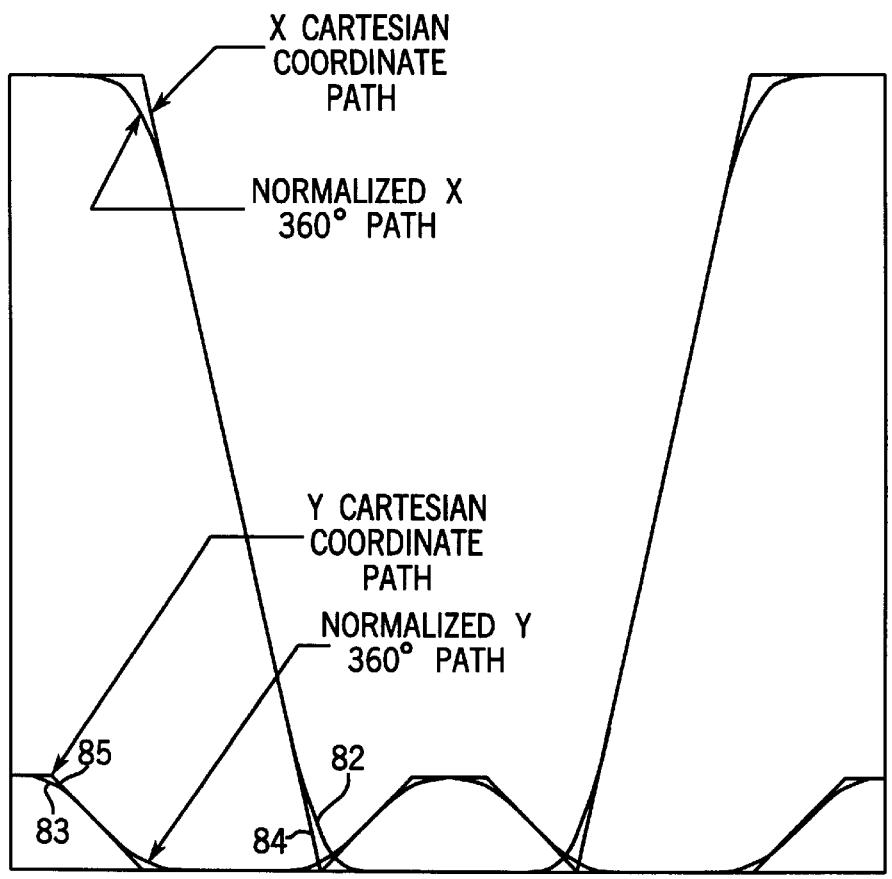
FIG. 11 is a graphical representation of normalized position curves based on sample data for X and Y axes.

Referring to FIG. 11, a graphical representation is illustrated of normalized position curves based on the sample data for the X and Y axes provided above. Accordingly, the smoothing effect of the curves 82,83 can be seen for the respective X and Y axes in comparison to the X and Y Cartesian coordinate path 84,85 that was initially provided by the user, as previously discussed with reference to Table A.

Figure 12:
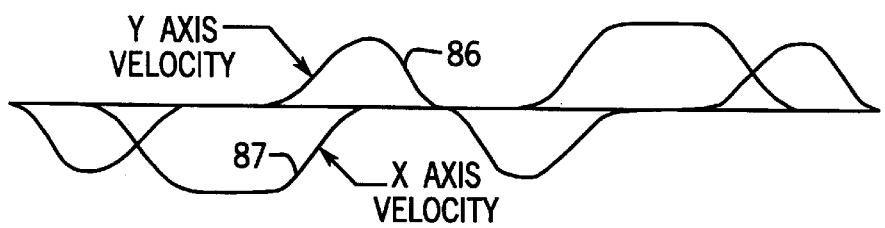
FIG. 12 is a graphical representation of normalized velocity curves based on sample data for X and Y axes.
Figure 13:
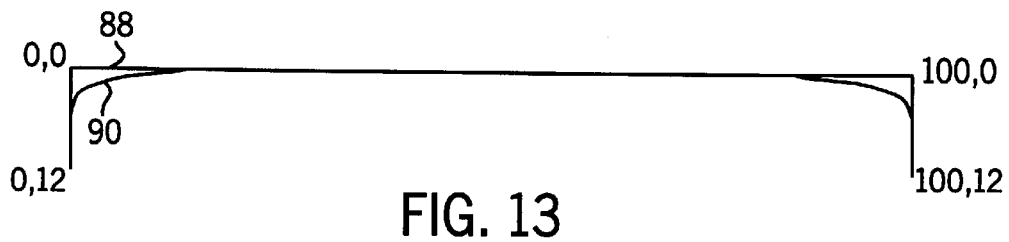
FIG. 13 is a graphical representation of an X-Y plot illustrating a generated path or motion profile based on sample data for X and Y axes.

FIG. 12 illustrates the normalized velocity curves 86,87 corresponding to FIG. 11. The initial path of Table A is illustrated in FIG. 13 as line 88. The resulting path generated from the path planning program 42, which is contained within table 40 as a series of X and Y coordinate points in arrays XP and YP, is illustrated as line 90.

A resulting path in accordance with the present invention creates a mechanical balance with respect to the motor velocity, acceleration and the machine's ability to move. The acceleration profile is placed at an optimal point with respect to the velocity profile of a motor. Peak acceleration is symmetrical so that when applied to different axes, there is a cancellation effect when applied on a system with a common bus creating a balance between the motors during operation. This balanced effect increases motor performance and speed, while at the same time prevents overloading the motors, which creates excessive motor wear and heat during operation.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A motion controller for providing multi-axis control of electric motors of a multi-axis machine, the controller comprising:

control means for controlling the motors of the machine in accordance with calculated positions set forth in a path planning table; and programming means for generating the path planning table, the programming means including means for proportionally spacing a series of coordinates based on predetermined factors, said series of coordinates corresponding to general positions of the machine along a complete cycle, means for calculating the path planning table from said proportionally spaced series of coordinates to determine said calculated positions based on a predetermined resolution using an S-curve mathematical equation that includes an alpha variable corresponding to an acceleration to jerk ratio, a value of the alpha variable being adjustable to allow for an optimal setting thereof.

2. The motion controller of claim 1, wherein each of the series of coordinates represents x and y coordinates corresponding to an x-axis and y-axis of the machine.

3. The motion controller of claim 2, wherein each series of coordinates further includes a speed value corresponding to a percentage of maximum motor speed.

4. The motion controller of claim 1, wherein the predetermined resolution is at least 720 positions.

5. The motion controller of claim 1, wherein the predetermined factors include distance, maximum speed and maximum acceleration factors.

6. The motion controller of claim 5, further comprising means for determining a maximum rate of speed for operating said motors along the path planning table where said control means controls the motors by sequencing said calculated positions at said determined maximum rate of speed.

7. A motion control system for providing multi-axis control of a multi-axis machine, the system comprising:

at least two electric motors operatively connected to the multi-axis machine;

control means for generating commands in accordance with calculated positions set forth in a path planning table;

motor drive means responsive to the control means and operatively connected to each of said electric motors for controlling the operation of said motors in response to commands received from the control means; and programming means for generating the path planning table, the programming means including:

input means for receiving from a user a series of coordinates representing general positions of a machine along a complete cycle, means for proportionally spacing the series of coordinates across an entire path based on distance, maximum speed and maximum acceleration factors, and means for generating the path planning table from said proportionally spaced series of coordinates to determine said calculated positions based on a predetermined resolution using an S-curve mathematical equation that includes an alpha variable corresponding to an acceleration to jerk ratio, a value of the alpha variable being adjustable to allow for an optimal setting thereof.

8. The system of claim 7, wherein each of the series of coordinates represents x and y coordinates corresponding to an x-axis and y-axis.

9. The system of claim 8, wherein each series of coordinates further includes a speed value corresponding to a percentage of maximum motor speed.

10. The system of claim 9, wherein the predetermined resolution is at least 720 positions.

11. The system of claim 7, further comprising means for determining a maximum rate of speed for operating said motors along the path planning table.

12. A method of generating a path planning table for use by a motion controller to control a multi-axis machine for movement along a path, the method comprising the steps of:

inputting a series of coordinates representing general positions of the machine along a cycle;

calculating a path planning table from said series of coordinates to determine calculated positions defining a path based on a predetermined resolution using an S-curve mathematical equation that includes an adjustable alpha variable corresponding to an acceleration to jerk ratio.

13. The method of claim 12, wherein the step of calculating the path planning table includes proportionally spacing the series of coordinates across the path based on predetermined factors before applying the S-curve mathematical equation.

14. The method of claim 13, wherein the predetermined factors include distance, maximum speed and maximum acceleration factors.

15. The method of claim 12, further comprising the steps of testing the machine during operation to determine motor performance values, modifying the value of the alpha variable based on the motor performance values, generating a new path planning table based on the modified value of alpha, and repeating the step of testing the machine to determine an optimal setting of the alpha variable to provide peak velocity and torque from motors of the machine.

16. The method of claim 15, further comprising the step of determining a maximum rate of speed for traversing along the path planning table during machine operation.

17. The method of claim 16, where the step of determining the maximum rate of speed includes comparing the maximum rate of speed at each position along the path planning table with a predetermined maximum speed for each axis of the machine and setting the maximum rate of speed to the lowest value of a maximum calculated rate of speed for each axis of the machine.

* * * * *